United States Patent [19]
Hudak et al.

[11] 4,207,460
[45] Jun. 10, 1980

[54] LOW POWER FREQUENCY MODULATED HYBRID FIBER OPTIC DATA ACQUISITION SYSTEM

[75] Inventors: Joseph M. Hudak, Rome, N.Y.; Gerald L. Zielinski, Downers Grove, Ill.; Charles G. Messenger, Rome, N.Y.

[73] Assignee: The United States of America as represented by the Secretary of the Air Force, Washington, D.C.

[21] Appl. No.: 950,751

[22] Filed: Oct. 12, 1978

Related U.S. Application Data

[63] Continuation of Ser. No. 698,984, Jun. 23, 1976, abandoned.

[51] Int. Cl.² .............................................. H04B 9/00
[52] U.S. Cl. ...................................................... 455/612
[58] Field of Search ............................................ 250/199

[56] References Cited

U.S. PATENT DOCUMENTS

| | | | |
|---|---|---|---|
| 3,497,616 | 2/1970 | McCown | 250/199 |
| 4,012,633 | 3/1977 | Huntley | 250/199 |
| 4,051,363 | 9/1977 | Fish | 250/199 |

*Primary Examiner*—Richard Murray
*Attorney, Agent, or Firm*—Joseph E. Rusz; William Stepanishen

[57] ABSTRACT

A fiber optic data transmission apparatus utilizing a modulated hybrid transmitter to transfer data with complete electrical isolation to a remote data reception and utilization center.

9 Claims, 2 Drawing Figures

LOW POWER FREQUENCY MODULATED HYBRID FIBER OPTIC DATA ACQUISITION SYSTEM

STATEMENT OF GOVERNMENT INTEREST

The invention described herein may be manufactured and used by or for the Government for governmental purposes without the payment of any royalty thereon.

This is a continuation of application Ser. No. 698,984, filed June 23, 1976, now abandoned.

BACKGROUND OF THE INVENTION

The present invention relates broadly to optical communications systems, and in particular to a low power frequency modulated hybrid fiber optic data transmission system.

In the testing of many electrical devices or systems which are required to transmit electrical signals or intelligence, a high degree of radio frequency interference security is necessary to insure accurate signal reproduction during monitoring. Screen rooms or anechoic chambers which have been utilized in the prior art for conducting sensitive RFI measurements, function on the principle of providing a high attenuation of spurious electromagnetic interference from within and without the test environment. However, such a shielded enclosure sometimes requires the transmission of data or electrical signals from the equipment within the shielded room to monitoring or control equipment outside the protected environment. These transmission links are a frequent source of cross-coupling for spurious electro-magnetic interference. In other words, RFI signals external to the chamber may enter the chamber, and the controlled r-f environment inside the chamber may be altered by absorption and reflection properties of hard wire cables.

In the prior art, when a transmission line has been employed to couple signals from within to without a shielded room, the elimination of spurious or undesired signals has been partially accomplished by the use of filters in the signal transmission line. This is not entirely satisfactory, however, because filters are basically bilateral devices which will conduct in either direction and will not prevent undesired signals from being passed if they are within the frequency pass band of the filter.

In addition, a specific problem which has been encountered is the testing of weapon systems that are susceptible to radio frequency jamming. The testing of such systems requires that the system be situated in a radio frequency controlled environment with no metallic wire or similar such paths linking the outside monitoring area with the interior of the chamber. The present invention utilizes a fiberglass transmission medium to link the monitored points of the weapon system within the chamber to the external monitoring station.

SUMMARY

The present invention utilizes a battery-powered transmitter that allows monitored signals to be transferred from the isolated unit under test to another area while allowing complete electrical isolation between the points of transmission and reception. Signals to be monitored are introduced into the battery powered hybrid transmitter located in the isolated unit to be monitored. The transmitter converts the monitored signal input to a frequency-modulated carrier which is applied to a light-emitting diode. The frequency-modulated light is then coupled to and transferred by a fiber optic light transmission cable. The signal is then received at the opposite end of the cable by a receiver utilizing a phototransistor converter assembly coupled to an amplifier and demodulator circuit. The demodulator extracts the signal information from the frequency-modulated carrier which is then fed to amplifier circuitry and then to external monitoring and and recording equipment.

It is one object of the present invention, therefore, to provide an improved fiber optic data transmission apparatus utilizing frequency-modulated techniques to prevent undesired d.c. level shift caused by fiber optic coupling variations.

It is another object of the invention to provide an improved fiber optic data transmission apparatus utilizing a low powered hybrid transmitter with high input impedance.

It is still another object of the invention to provide an improved fiber optic data transmission apparatus having a low noise field effect transistor transmitter front end.

It is yet another object of the invention to provide an improved fiber optic data transmission apparatus utilizing input zener diode protection (transmitter) to prevent against large signal swings and high static voltages.

It is still a further object of the invention to provide an improved fiber optic data transmission apparatus to have the capability of DC signal transmission.

These and other advantages, objects and features of the invention will become more apparent from the following description taken in connection with the illustrative embodiment in the accompanying drawings.

DESCRIPTION OF THE PREFERRED EMBODIMENT

The present invention has the capability of transmitting electrical data for various signal inputs in the range of D.C. to 10 khz and in situations which require the signal source be completely isolated from the monitoring point. The complete single channel path is comprised of a frequency-modulated hybrid designed transmitter which uses a voltage-controlled oscillator (VCO) as the carrier signal source. A high input impedance field-effect transistor is provided to condition the input signal which drives the voltage-controlled oscillator. The voltage-controlled oscillator output drives a buffer circuit which is connected to and activates the light-emitting diode (LED) that is used to drive the fiber optic cable. The fiber optic cable is utilized as the method of signal transmission between the transmitter and receiver. The receiver is comprised of a phase-locked loop (PLL) demodulator which is driven by a current-to-voltage converter and phototransistor assembly that changes the light varying input signal to the original form of a frequency-modulated signal. The received light signal is processed by the phase-locked loop which converts it to the original monitored signal applied to the transmitter input. The output of the phase-locked loop demodulator controls an amplifier circuit which drives the desired monitoring equipment.

Figure 1:
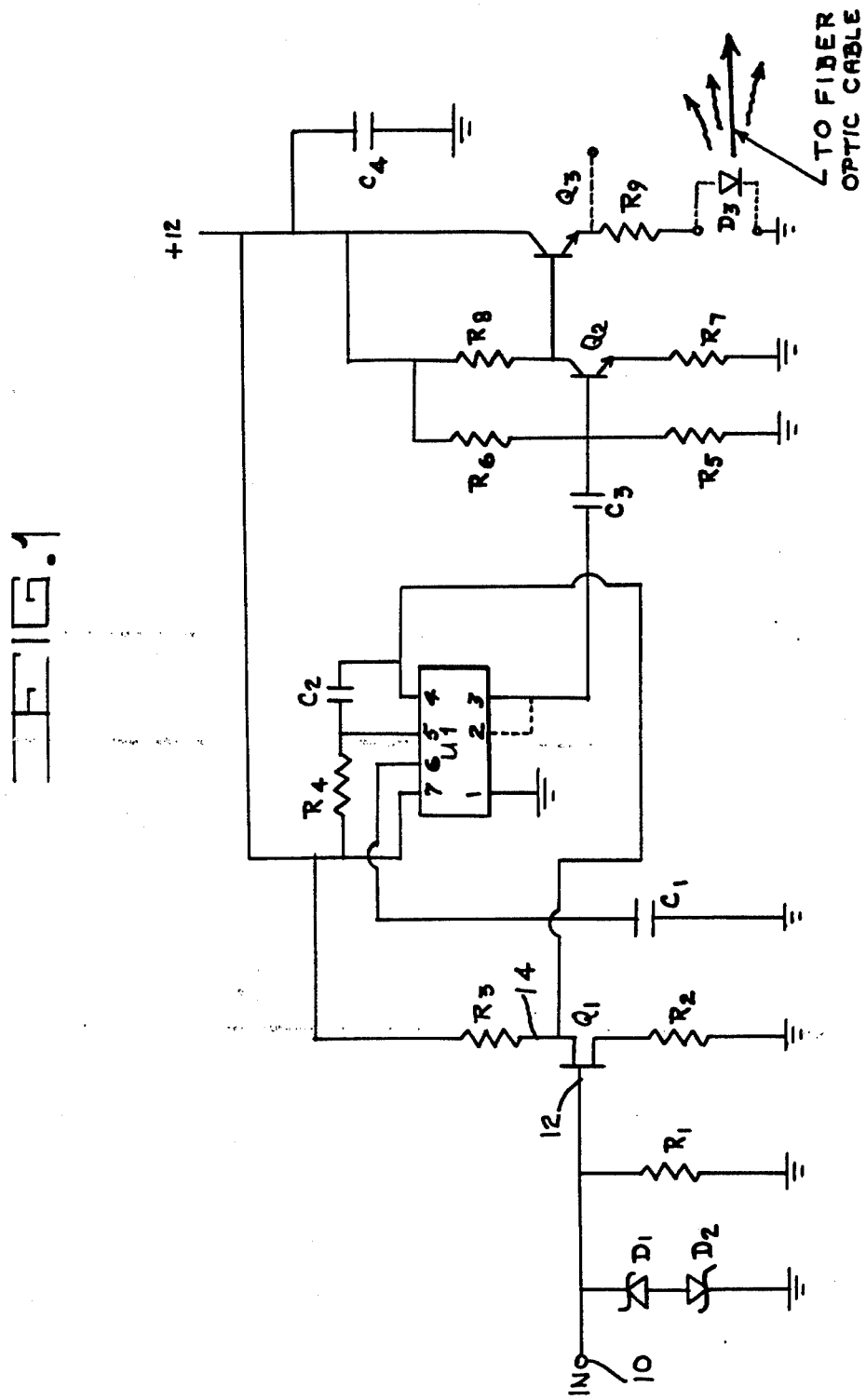
FIG. 1 is a schematic diagram of the fiber optic data transmission apparatus hybrid transmitter in accordance with the present invention, and, FIG. 2 is a schematic diagram of the receiver apparatus of the fiber optic data transmission system.

Referring now to FIG. 1, there is shown a transmitter apparatus having a signal input terminal 10 which is connected to the gate 12 of transistor, Q1. The input signal which is to be monitored is applied to terminal 10 and is thus fed to the gate 12 of the field-effect transistor (FET) $Q_1$. Zener diode protection, $D_1$ and $D_2$, is provided such that a signal greater than ±9 volts input will be clipped in order to protect the $Q_1$ gate oxide. The resistor $R_1$ is provided between the gate 12 and ground and may be connected to form a portion of an input attenuator network if the input signal is greater than 1 volt peak-to-peak, the dynamic linear input range of transmitter $Q_1$. The resistor $R_1$ may be eliminated in the event that the input signal excursion is small and/or if a very high input impedance is required. The input signal which is voltage amplified by transistor $Q_1$ provides the control voltage input of the voltage controlled oscillator. The D.C. voltage on the drain 14 of transistor $Q_1$ is coupled to and provides the bias for the control pin of the VCO. The output of the voltage controlled oscillator $U_1$, which is now frequency-modulated is fed to a voltage amplifier ($Q_2$) and then to a current buffer, $Q_3$ which drives the light-emitting diode, $D_3$. The light-emitting diode is coupled to the fiber optic cable which carries the light varying information from the transmitter to the receiver.

Figure 2:
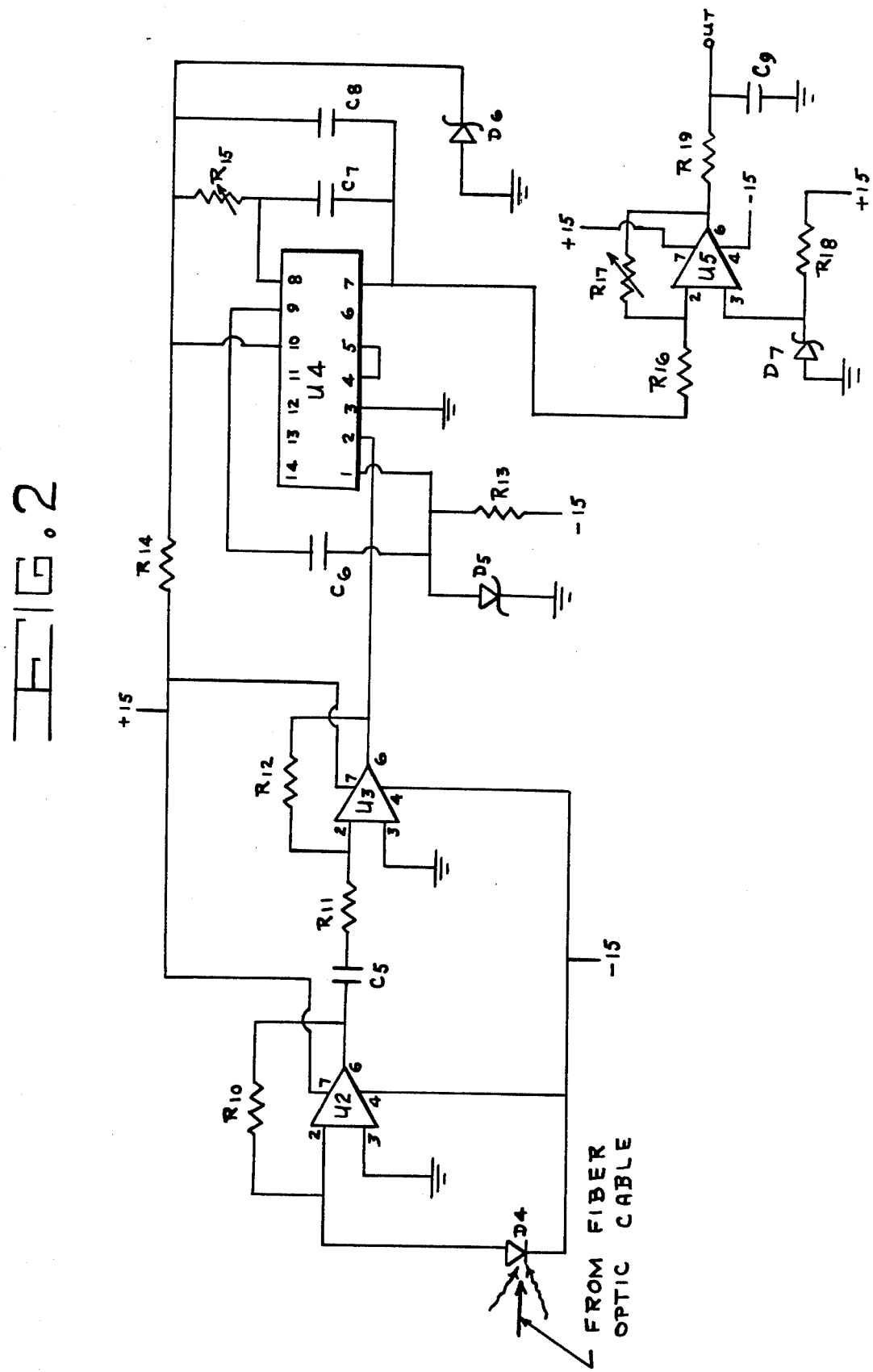

Turning now to FIG. 2, there is shown the receiver portion of the present invention which receives the light signal that is being transmitted via the fiber optic cable. The input stage is comprised of the phototransistor $D_4$ and current-to-voltage converter unit, $U_2$ which changes the light variations from the fiber optic cable to electrical frequency-modulated variations. The output of the $U_2$ stage is applied to a voltage amplifier, $U_3$ which drives the input of the phase-locked loop demodulator, $U_4$. The phase-locked loop demodulator, $U_4$, changes the frequency-modulated input into voltage variations which represent the original signal input that was applied to the transmitter. The demodulator $U_4$ accomplishes this by comparing the frequency of its internal oscillator with the frequency of the incoming signal which was produced by the voltage-controlled oscillator in the transmitter. A phase detector circuit which forms a part of the phase-locked loop performs this comparison. A difference between these two frequencies produces an output which changes the internal oscillator frequency that is fed back to the phase detector. A resultant error voltage is produced at the output of the phase-locked loop representing the constantly changing differences between the input carrier of the transmitter and the internal oscillator frequency of the phase-locked loop. This error signal represents the input signal to the transmitter which was originally transmitted. The output of the phase-locked loop is fed to another voltage amplifier $U_5$ and then to external recording and monitoring equipment. $R_{15}$ is the d.c. level output adjustment potentiometer.

The hybrid transmitter which has been described specifically is capable of use in low-power small space applications. Consideration has been given in the design for a wide degree of versatility depending on the application need. First of all, it may be noted that the optional use of resistor $R_1$ would require only the use of a single external resistor to form a divider network in the event that the input signal exceeds the linear dynamic range (1 volt peak-to-peak) of transistor $Q_1$. If the input signal is within the linear dynamic range and extremely high input impedance is desired, resistor $R_1$ may be eliminated by the simple omission of a wire bound within the package. Second, the carrier frequency of the voltage-controlled oscillator $U_1$ may be changed to suit the frequency of input data by available pins which allow paralleling of internal timing components $C_1$ and $R_4$ with external components to provide an increase in the carrier frequency and thus allow a higher transmitted signal frequency. The selection of the carrier waveshape can also be either a triangle or square waveform by bonding the appropriate output pad on the voltage controlled oscillator chip $U_1$. Finally, the current drain through the light emitting diode, $D_3$ may be varied to maximize the light output need vs current drain. Thus, assuming that a short length fiber optic line is driven, the light necessary from light emitting diode $D_3$ would be smaller than if a long line were driven in order to get an effective transfer through the optic cable. This would reduce the requirement for current drain through light-emitting diode $D_3$, thus conserving battery power. Resistor $R_9$ is the resistor internal to the package which limits the light-emitting diode $D_3$ current to sufficiently drive 20 feet of optics cable. This resistor may be bypassed and an external resistor of a proper current limiting value may be used.

The transmitter as designed draws a nominal current value of 17 ma. from a ±15 volt source (255 milliwatts) which makes it appropriate for battery operation. The following parts list is an example of the typical component values and devices which may be utilized in the circuits shown in FIGS. 1 and 2:

| PARTS LIST | |
|---|---|
| Resistor, $R_1$-110K | Capacitor, $C_2$-300 pf |
| Resistor, $R_2$-1 K | Capacitor, $C_2$-.0022 uf |
| Resistor, $R_3$-2.2K | Capacitor, $C_3$-.0022 uf |
| Resistor, $R_4$-3.3K | Capacitor, $C_4$-.0022 uf |
| Resistor, $R_5$-3.3K | Capacitor, $C_5$-.01 uf |
| Resistor, $R_6$-22K | Capacitor, $C_6$-27D pf |
| Resistor, $R_7$-680 | Capacitor, $C_7$-.01 uf |
| Resistor, $R_8$-3.3K | Capacitor, $C_8$-.012 uf |
| Resistor, $R_9$-1K | Capacitor, $C_9$-.0022 uf |
| Resistor, $R_{10}$-.220K | Diode $D_1$-9.1V zener |
| Resistor, $R_{11}$-1.2K | Diode $D_2$-9.1V zener |
| Resistor, $R_{12}$-15K | Diode $D_3$-SSL15 |
| Resistor, $R_{13}$-4.7K | Diode $D_4$-LI5E |
| Resistor, $R_{14}$-4.7K | Diode $D_5$-1N755 |
| Resistor, $R_{15}$-50K pot | Diode $D_6$-1N755 |
| Resistor, $R_{16}$-110K | Diode $D_7$1N749 |
| Resistor, $R_{17}$-1 meg pot | |
| Resistor, $R_{18}$-470 | |
| Resistor, $R_{19}$-15K | |
| Transistor, $Q_1$-2N3796 | |
| Transistor, $Q_2$-2N2222 | |
| Transistor, $Q_3$-2N2222 | |
| Integrated Circuit, $U_1$-NE566V | |
| Integrated Circuit, $U_2$-μA741 | |
| Integrated Circuit, $U_3$-μA741 | |
| Integrated Circuit, $U_4$-NE565 | |
| Integrated Circuit, $U_5$-μA741 | |
| Resistors-$R_1$ through $R_9$ are thick film resistors | |
| Capacitors-$C_1$ through $C_4$ are chip capacitors | |
| Transistors-$Q_1$ through $Q_3$ are chip transistors | |
| Circuit-$U_1$ is a chip integrated circuit | |
| Diodes-$D_1$ and $D_2$ are chip diodes | |
| Fiber Optic Cable 20 feet #5011 Corning | |

Although the invention has been described with reference to a particular embodiment, it will be understood to those skilled in the art that the invention is capable of a variety of alternative embodiments within the spirit and scope of the appended claims.

What is claimed is:

1. A fiber optic data transmission apparatus is comprised of:
   a transmitter means receiving an input signal from a test unit, said input signal comprising D.C. components as well as high frequency components, said transmitter means utilizing a linear driver means to frequency modulate said input signal on a carrier frequency while preserving the carrier waveshape, said transmitter means providing a first output signal, said first output signal being transformed into infrared radiation,
   said transmitter means is comprised of
   a high input impedance means to receive said input signal,
   a voltage controlled oscillator connected to said high input impedance means to receive said input signal, said input signal driving said voltage controlled oscillator to provide said first output signal, and
   a signal conversion means connected to said voltage controlled oscillator to transform said first output signal to said infrared radiation
   a transmission means connected to said transmitter means to receive and conduct said infrared radiation, and
   a receiver means connected to said transmission means to receive said infrared radiation therefrom, said receiver means converting said infrared radiation into a second output signal, said receiver means processing and converting said second output signal to provide a monitored signal, said monitored signal being a reproduction of said input signal originally applied to said transmitter means.

2. A fiber optic data transmission apparatus as described in claim 1 wherein said transmission means being an optical transmission is comprised of a fiber optic cable.

3. A fiber optic data transmission apparatus as described in claim 1 wherein said receiver means is comprised of
   a photoelectric conversion means to receive and convert said infrared radiation to said second output signal, and
   a phase-locked loop demodulator to convert said second output signal into said monitored signal, said monitored signal being said input signal.

4. A fiber optic data transmission apparatus as described in claim 3 wherein said photoelectric conversion means is comprised of a phototransistor to detect said infrared radiation and a current to voltage converter means to convert said phototransistor output current to an electric voltage.

5. A fiber optic data transmission apparatus as described in claim 1 wherein said input signal may have a signal frequency in the range from D.C. to 10 KHz.

6. A fiber optic data transmission apparatus as described in claim 1 wherein said first output signal is a frequency modulated signal.

7. A fiber optic data transmission apparatus as described in claim 1 wherein said high input impedance means is a field-effect transistor.

8. A fiber optic data transmission apparatus as described in claim 1 wherein said signal conversion means is a light emitting diode.

9. A fiber optic data transmission apparatus as described in claim 1 wherein the transmitter carrier frequency can be varied by modulation of the power supply voltage.

* * * * *